[Patented July 11, 1939]

UNITED STATES PATENT OFFICE 2,165,499

PRINTING OF ARTIFICIAL FOILS, FILMS, AND SIMILAR PRODUCTS

William Henry Moss, London, England, assignor to Celanese Corporation of America, a corporation of Delaware No Drawing. Application May 5, 1936, Serial No. 77,922. In Great Britain May 17, 1935

12 Claims. (Cl. 101—426)

This invention relates to improvements in or relating to the printing of artificial foils, films and similar products, and particularly to improvements in inks employed in the production thereon of wood grain and other printed effects, and to the printed products obtained with such inks.

When attempts are made to produce printed foils, films and similar products (hereinafter referred to generically as films) by printing them with the usual inks which have a drying oil base, it is found that various difficulties arise, particularly in the case of films having a bases of cellulose acetate or other organic derivative of cellulose. In particular, it is found that it is very difficult to obtain satisfactory adhesion between the printed film and another material, for example flock, a fabric or wood, when, as is usually desirable, the side to which the ink has been applied is in contact with the other material, since it appears that the oil base forms a coating on the surface of the film which prevents proper adhesion between the adhesive and the film.

It has now been discovered that these difficulties may be avoided, and in particular printed films may be obtained which may be caused to adhere very satisfactorily to other materials, when a printing ink is employed which contains cellulose acetate or other cellulose derivative and a plasticiser therefor, preferably in a high proportion based on the weight of the cellulose derivative, for example a proportion of 500 to 1000 up to 2000% or more. Preferably films having a basis of a cellulose derivative are printed with an ink which contains the same cellulose derivative, and in any case in order to obtain the best results it is desirable that the plasticiser present in the ink should also be a plasticiser for the base of the film. In addition to the cellulose derivatives and plasticisers the inks also contain suitable proportions of pigments and may contain solvents of high, medium or low volatility and/or diluents. Examples of suitable plasticisers which may be employed in the inks of the present invention are di- and triacetins, triphenyl acetin, methyl and ethyl toluene sulphonamides, diethyl phthalate and dibutyl tartrate, while solvents and diluents which may be employed include diacetone alcohol, ethyl lactate, glycol-mono-acetate, methyl-glycol-mono-acetate, acetone, dioxane, methylene ethylene ether, alcohol and benzene.

The inks may be applied to the films by any suitable printing process, but it is found that they are particularly valuable when the films are printed by an intaglio printing process. The term "printing" is employed in the present specification to include any process by which pattern or other effects are produced by the application of an ink to one or both surfaces of a film. For example, the effect may be produced by spraying or by contacting the film with an engraved or other suitable surface carrying the ink.

The consistency of the ink may be modified to suit the particular printing process for which it is designed, e. g. by suitable selection of the plasticiser and of the proportion of plasticiser employed. For example inks for lithographic work should in general be more viscous than inks for intaglio printing and this higher viscosity may be obtained by the use of solid plasticisers or of lower proportions of liquid plasticisers than are employed in inks for intaglio printing.

The products of the present invention may consist solely of the printed film, or they may be backed, for example with a lacquer having a basis of cellulose acetate or other cellulose derivative. The present invention is of particular value in the manufacture of backed products, since a substantially homogeneous product may be obtained by printing a film having a basis of a cellulose derivative, and backing it with a cellulose derivative lacquer, whereas when a film printed with an oil base ink is backed, the oil base appears to form a film between the two laminae, so that the product consists of three distinct layers.

The products of the present invention, whether or not they have a cellulose derivative or other backing, may be caused to adhere to fabrics, particularly fabrics containing yarns of organic derivatives of cellulose, and in this connection reference is made to United States application S. No. 3,369, filed the 24th day of January 1935, wherein improved methods of effecting adhesion between components of different natures, e. g., organic derivative of cellulose and wood, are described. Thus, a printed cellulose acetate film backed with a cellulose acetate lacquer may be caused to adhere to a satin-faced cellulose acetate-cotton fabric, as described in United States application S. No. 3,369, and the product thus obtained may be used alone or may be stuck to wood or similar surfaces. Again, fine, short fibres in the form known as "flock" may be caused to adhere to the back of a printed film, for example by coating the back with a suitable cellulose derivative solution and blowing the flock on to the back when the solution is tacky. In this manner various decorative effects may be produced, and also, if suitable fibres are employed, for example natural or artificial cellulosic fibres, the product is very suitable for sticking to wood and similar materials.

The following examples are given to illustrate the invention:

Example 1

The following is an example of the composition of a brown ink according to the present invention:

| | Parts by weight |
|---|---|
| Cellulose acetate | 24 |
| Carbon black | 50 |
| Red oxide of iron | 180 |
| Benzyl alcohol | 157 |
| Triacetin | 400 |
| Acetone | 40 |
| Benzene | 25 |
| Alcohol | 18 |

If a red ink is required 460 parts by weight of Helio red are employed instead of the carbon black and iron oxide, while for a black ink the iron oxide is omitted and the amount of carbon black is increased to 100 parts by weight. The inks described in the above example are of a consistency which is suitable for intaglio printing.

Example 2

The following is an example of an ink suitable for use where an ink of stiffer consistency is required:

| | Parts by weight |
|---|---|
| Cellulose acetate | 10 |
| Carbon black | 90 |
| Triacetin | 150 |
| Benzyl alcohol | 100 |
| Acetone | 20 |
| Benzene | 17 |
| Alcohol | 16 |

Example 3

The following is an example of a suitable lacquer for backing a printed film:

| | Parts by weight |
|---|---|
| Cellulose acetate | 60 |
| Pigment | 46.5 |
| Triacetin | 18 |
| Acetone | 160 |
| Benzene | 100 |
| Alcohol | 70 |
| Diacetone alcohol | 57 |

The present invention is of particular value in relation to the printing of films having a basis of cellulose acetate, but it may also be employed in connection with films having a basis of other cellulose derivatives, for example cellulose butyrate, cellulose nitro-acetate, cellulose nitrate and other esters and mixed esters of cellulose, ethyl, methyl, butyl and benzyl celluloses and other cellulose ethers and mixed ethers, and cellulose ether-esters, for example ethyl cellulose acetate and oxy-ethyl cellulose acetate. Moreover, the novel ink described in the present application may be employed in printing processes in general.

Instead of cellulose derivatives the novel inks of the present invention may contain other plasticisable bases, for example resins, in conjunction with suitable plasticisers therefor. Examples of resins which may be employed in the inks are diphenylol-propane formaldehyde resins, phenol formaldehyde resins, resins of the glyptal type, i. e., resins formed by the condensation of di- or polyhydric alcohols with di- or polybasic acids, ester gum and colophony.

Further, the inks of the present invention may be employed in the printing of articles in general, e. g. moulded products having a basis of cellulose acetate or other organic derivative of cellulose.

Having described my invention what I desire to secure by Letters Patent is:

1. A printing ink which comprises a pigment, plasticizable material comprising an organic derivative of cellulose and a plasticizer therefor in a proportion of at least 500% of the total weight of the plasticizable material.

2. A printing ink which comprises a pigment, plasticizable material comprising an organic derivative of cellulose and a plasticizer therefor in a proportion of at least 1000% of the total weight of the plasticizable material.

3. A printing ink which comprises a pigment, plasticizable material comprising cellulose acetate and a plasticizer therefor in a proportion of at least 1000% of the total weight of the plasticizable material.

4. Process for the production of printed effects on films made of an organic derivative of cellulose, which comprises printing them with a printing ink which comprises a pigment, plasticizable material comprising an organic derivative of cellulose and a plasticizer therefor in a proportion of at least 500% of the total weight of the plasticizable material.

5. Process for the production of printed effects on films having a basis of cellulose acetate which comprises printing them with a printing ink which comprises a pigment, plasticizable material comprising cellulose acetate and a placticizer therefor in a proportion of at least 1000% of the total weight of the plasticizable material.

6. Process for the production of printed effects on films made of organic derivatives of cellulose, which comprises printing them by the intaglio printing process with a printing ink which comprises a pigment, plasticizable material comprising an organic derivative of cellulose and a plasticizer therefor in a proportion of at least 500% of the total weight of the plasticizable material.

7. Process for the production of printed effects on films made of cellulose acetate, which comprises printing them by the intaglio printing process with a printing ink which comprises a pigment plasticizable material comprising cellulose acetate and a plasticizer therefor in a proportion of at least 500% of the total weight of the plasticizable material.

8. Process for the production of printed effects on films made of organic derivatives of cellulose, which comprises pirnting them with a printing ink which comprises a pigment, plasticizable material comprising the same organic derivative or cellulose as is present in the film and a plasticizer therefor in a proportion of at least 500% of the total weight of plasticizable material.

9. Process for the production of printed effects on films made of organic derivatives of cellulose, which comprises printing them by the intaglio printing process with a printing ink which comprises a pigment, plasticizable material comprising the same organic derivative of cellulose as is present in the film and a plasticizer therefor in a proportion of at least 500% of the total weight of the plasticizable material.

10. Process for the production of printed effects on films made of organic derivatives of cellulose, which comprises printing them with a printing ink which comprises a pigment, plasticizable material comprising an organic derivative of cellulose and a plasticizer therefor in a proportion of at least 500% of the total weight of the plasticizable material and backing the printed side of the film with a lacquer having a basis of an organic derivative of cellulose.

11. Process for the production of printed effects on films made of organic derivatives of cellulose, which comprises printing them with a printing ink which comprises a pigment, plasticizable material comprising an organic derivative of cellulose and a plasticizer therefor in a proportion of at least 500% of the total weight of the plasticizable material and backing the printed side of the film with a fabric having a basis of an organic derivative of cellulose.

12. Process for the production of printed effects on films made of cellulose acetate, which comprises printing them with a printing ink which comprises a pigment, plasticizable material comprising cellulose acetate and a plasticizer therefor in a proportion of at least 500% of the total weight of the plasticizable material and backing the printed side of the film with a backing having a basis of cellulose acetate.

WILLIAM HENRY MOSS.

CERTIFICATE OF CORRECTION.

Patent No. 2,165,499.                                        July 11, 1939.

WILLIAM HENRY MOSS.

It is hereby certified that error appears in the printed specification of the above numbered patent requiring correction as follows: Page 2, second column, line 55, claim 8, for "pirnting" read printing; line 58, same claim, for "or" read of; line 60, same claim 8, before "plasticizable" insert the; and that the said Letters Patent should be read with this correction therein that the same may conform to the record of the case in the Patent Office.

Signed and sealed this 12th day of September, A. D. 1939.

(Seal)                                                  Henry Van Arsdale,
Acting Commissioner of Patents.

ative of cellulose and a plasticizer therefor in a proportion of at least 500% of the total weight of the plasticizable material and backing the printed side of the film with a lacquer having a basis of an organic derivative of cellulose.

11. Process for the production of printed effects on films made of organic derivatives of cellulose, which comprises printing them with a printing ink which comprises a pigment, plasticizable material comprising an organic derivative of cellulose and a plasticizer therefor in a proportion of at least 500% of the total weight of the plasticizable material and backing the printed side of the film with a fabric having a basis of an organic derivative of cellulose.

12. Process for the production of printed effects on films made of cellulose acetate, which comprises printing them with a printing ink which comprises a pigment, plasticizable material comprising cellulose acetate and a plasticizer therefor in a proportion of at least 500% of the total weight of the plasticizable material and backing the printed side of the film with a backing having a basis of cellulose acetate.

WILLIAM HENRY MOSS.

CERTIFICATE OF CORRECTION.

Patent No. 2,165,499. July 11, 1939.

WILLIAM HENRY MOSS.

It is hereby certified that error appears in the printed specification of the above numbered patent requiring correction as follows: Page 2, second column, line 55, claim 8, for "pirnting" read printing; line 58, same claim, for "or" read of; line 60, same claim 8, before "plasticizable" insert the; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.